United States Patent
Fox et al.

(10) Patent No.: US 6,667,354 B1
(45) Date of Patent: Dec. 23, 2003

(54) STABLE LIQUID SUSPENSION COMPOSITIONS AND SUSPENDING MEDIUMS FOR SAME

(75) Inventors: Kelly B. Fox, Bartlesville, OK (US); Alvin Evans, Jr., Bartlesville, OK (US)

(73) Assignee: Phillips Petroleum Company, Barltesville, OK (US)

( * ) Notice: Subject to any disclaimer, the term of this patent is extended or adjusted under 35 U.S.C. 154(b) by 430 days.

(21) Appl. No.: 09/618,444

(22) Filed: Jul. 18, 2000

(51) Int. Cl.[7] .................................................. C08K 5/09
(52) U.S. Cl. ............................. 524/35; 524/42; 524/43; 524/44; 524/45; 524/46; 524/47; 524/50; 524/55; 524/58; 524/59; 524/62; 524/72; 524/306; 524/314; 524/315
(58) Field of Search ............................. 524/35, 42, 43, 524/44, 45, 46, 47, 50, 55, 58, 59, 62, 72, 306, 314, 315

(56) References Cited

U.S. PATENT DOCUMENTS

| | | | |
|---|---|---|---|
| 5,091,448 A | 2/1992 | Hostettler et al. | 524/45 |
| 5,631,313 A | 5/1997 | Bishop et al. | 524/45 |
| 5,834,533 A | 11/1998 | Patel et al. | 523/130 |

*Primary Examiner*—Bernard Lipman
(74) *Attorney, Agent, or Firm*—Joe Hulett; Rodney B. Carroll; Conley Rose, P.C.

(57) ABSTRACT

Stable and environmentally friendly suspensions of solid particulates are provided through the addition of such solid particulates to a suspension medium which is comprised of a liquid carrier, a liquid carrier soluble resin, an organophyllic clay, and an activator wherein said liquid carrier is a carboxylic acid ester, preferably 2-ethylhexyl oleate, said liquid carrier soluble resin is selected from the group consisting of styrene-isoprene copolymers, styrene ethylene-propylene block copolymers, styrene isobutylene copolymers, styrene butadiene copolymers, polybutylene, polystyrene, polyethylene-propylene copolymers, methyl methacrylate and mixtures thereof, said organophyllic clay is one of kaolinite, halloysite, vermiculite, chlorite, attapullgite, smectite, montmorillonite, bentonite, hectorite, and mixtures thereof and said activator is an alcohol of the formula ROH wherein R is an alkyl group of 1 to 10 carbon atoms.

19 Claims, No Drawings

STABLE LIQUID SUSPENSION COMPOSITIONS AND SUSPENDING MEDIUMS FOR SAME

This invention relates to novel suspension mediums and stable liquid suspension compositions formed with same which can be used in a water-based fluid.

BACKGROUND OF THE INVENTION

Water-based fluids such as, for example, drilling fluids and mining fluids, are useful in a variety of industrial applications. It is well known to those skilled in the art of drilling wells to tap subterranean deposits of natural resources such as gas, geothermal steam or oil, especially when drilling by the rotary method or the percussion method wherein cuttings must be removed from the bore hole, that it is necessary to use a drilling fluid.

The use of water-based fluids in workover and completion fluids in oil field operations is also well known. Workover fluids are those fluids used during remedial work in a drilled well. Completion fluids are those fluids used during drilling and during the steps of completion of the well.

Additives, chemicals, or other materials are often added to such water-based fluids for various reasons such as for controlling water loss, increasing viscosity, reducing corrosion, altering pH, and increasing density of the fluids. However, the addition of such materials to water-based fluids can be difficult unless proper precautions are taken to preclude agglomeration or plugging.

Liquid additives and processes therefor have been developed to overcome some of the problems. For example, U.S. Pat. No. 5,091,448 provides an excellent stable liquid additive and process for preparing the stable liquid additive suspension. However, such stable liquid additive suspension contains a hydrocarbon as a liquid carrier which precludes the use of such systems in some areas where environmental regulations are of concern.

It is therefore highly desirable to develop a liquid suspension composition which remains stable and is useable as an additive in water or water-based fluids and which is environmentally friendly for use in oil field applications.

SUMMARY OF THE INVENTION

It is thus an object of this invention to provide a stable liquid suspension composition which is environmentally friendly and useful in oil field applications.

Another object of this invention is to provide a novel suspending agent which is useful for the formation of stable suspension compositions.

Other aspects, objects, and the several advantages of the invention will become more apparent in light of the following disclosure.

The present invention is based upon our discovery that a stable suspension composition which is environmentally friendly and thus readily useful in oil field applications is obtained when there is employed as the suspension medium a composition which is formed by the admixing of a liquid carrier, a liquid carrier soluble resin, an organophyllic clay, and an activator. Such suspension compositions exhibit excellent shelf life and avoid the use of a hydrocarbon which would otherwise preclude the use of such suspension compositions where environmental regulations are of concern.

DETAILED DESCRIPTION OF THE INVENTION

The ingredients useful in preparing the novel suspension mediums in accordance with the present invention comprise a liquid carrier, a liquid carrier soluble resin, an activator, and an organophyllic clay.

The term "liquid carrier" as used herein is intended to mean a compound of the formula

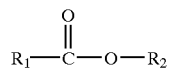

wherein $R_1$ is a $C_{10}$–$C_{20}$ alkyl, preferably $C_{15}$–$C_{18}$, and more preferably $C_{17}$, and $R_2$ is a lower alkyl radical of 1 to 10 carbon atoms, preferably 8. In a presently preferred embodiment of the invention, the liquid carrier is the 2-ethylhexyl oleate (Finagreed BDMF ester from Fina Chemicals).

The term "liquid carrier soluble resin" as used herein is intended to mean any resin which is soluble in the liquid carrier component of the suspension medium. Examples of such soluble resins include styrene isoprene copolymers, styrene ethylene-propylene block copolymers, styrene isobutylene copolymers, styrene butadiene copolymers, polybutylene, polystyrene, polyethylene-propylene copolymers, methyl methacrylate, and mixtures thereof.

Presently preferred are block copolymers, examples of which include, but are not limited to, styrene ethylene-propylene block copolymer, hydrogenated styrene-isoprene block copolymer, and styrene butadiene copolymer. Most particularly preferred are hydrogenated styrene-isoprene block copolymers, examples of which include, but are not limited to, compounds sold under the trademark SHELLVIS 40 and SHELLVIS 50 by Shell Chemical Company.

The term "organophyllic clay" as employed herein is intended to mean those clays which have been treated with a cationic surfactant so as to distribute amine groups on the surface of some. Examples of such clays include kaolinite, halloysite, vermiculite, chlorite, attapulgite, smectite, montmorillonite, illite, bentonite, hectorite, and mixtures thereof. The presently preferred clay is sodium montmorillonite, which is also known as hectorite clay, which has been treated with an alkylaryl amine surfactant. Such organophyllic clays are commercially available from Rheox, Inc. of Hightstown, N.J.

The term "activator" as used herein is intended to mean a compound which is added to the suspension medium to assist the clay component therein to develop viscosity. Such compounds are at least one selected from the group consisting of lower alkyl alcohols of the formula ROH wherein R is a 1 to 8 carbon alkyl, preferably 2, a glycol such as ethylene glycol and propylene glycol and glycerine.

The term "solid particulate" as employed herein is intended to mean any solid particle which is capable of being suspended in the novel suspension medium of the present invention. Any solid particulate that is substantially insoluble, or partially soluble in the liquid suspending medium can be used in the practice of this invention. Examples of suitable solid particulates include, but are not limited to polymers, herbicides, insecticides, sulfonated asphalt, salts of sulfonated asphalt, lime, sodium bicarbonate, sodium carbonate, molybdenum disulfide, sodium hydroxide, graphite, zinc, tin, quebracho, lignin, lignosulfonate, lignite, caustisized lignate, lignosulfoante, chrome lignosulfoante, naphthalenesulfonate, unintahite (gilsonite), and combinations of two or more of same.

In one presently preferred embodiment of the present invention, the solid particulate is at least one compound selected from the group consisting of guar gum, cellulose derivatives such as carboxy ethyl cellulose and carboxyl methyl cellulose, xanthan gum, sodium tetra borate (Borax), ethylene diamine tetracetic acid, nitrillotetraacetic acid, polyacrylamide, and vinyl polymers.

Blending of the selected ingredients for forming the suspension medium of the present invention can be carried out in any manner but generally the selected ingredients are added to the liquid carrier. It is preferred that following the addition of the clay component to the liquid carrier there is thereafter added the activator at a high shear rate to permit the clay or silica component to develop viscosity and thereafter the selected liquid carrier soluble resin is added to form the suspension medium to which the solid particulate is then added with agitation so as to form the desired stable particulate suspension of this invention.

The solid particulates employed in the formation of the stable suspensions of the present invention should in general be a particle size such that the diameter of same in the range of from about 1 to about 2500 microns.

All water soluble polymers are useful in the practice of this invention. Examples of such polymers and the methods for producing and/or obtaining them are disclosed in Bishop, U.S. Pat. No. 4,735,659, which is incorporated herein by reference. Particularly preferred is carboxy methyl cellulose. The water soluble polymers are well known in the art. Such water soluble polymers are selected from the group consisting of the cellulose ethers, starches, gums, vinyl polymers, acrylic polymers, and bipolysaccharides. Further examples of such polymers are disclosed in Hostettler et al, U.S. Pat. No. 5,091,448, which is incorporated herein by reference. Further examples of solid particulates which can be employed in the practice of the present invention are also disclosed in Patel et al, U.S. Pat. No. 5,834,533, which is incorporated herein by reference.

In the practice of certain preferred embodiments of the present invention through the selection of the solid particulate there is achieved certain advantages when the suspension is utilized in drilling operations. Thus, when there is used a suspension comprising guar gum, or a cellulose derivative such as hydroxy ethyl cellulose or carboxy methyl cellulose, there is obtained enhanced water loss control. When there is employed a suspension composition comprising a xanthan gum, there is obtained an enhancement of the suspension capability of the drilling fluid. Thus, through the use of the suspension systems of the present invention there is obtained systems which are not only environmentally friendly but which also assist in the enhancement of drilling, fracturing, or completion fluids.

In addition to the use of the liquid carrier for the suspension medium ingredients, there can be utilized as the liquid carrier a mixture of the selected ester carrier and a vegetable oil. Such vegetable oils are triglycerides extracted from seeds. Examples of suitable vegetable oils are soybean oil, peanut oil, sunflower seed oil, and rap seed oil. Generally, when the vegetable oil is employed, such oil is employed in an amount in the range of about 10 to about 50 weight percent of the total liquid carrier.

In addition, while not required for the formation of the suspension systems of the present invention, there can be employed water in an amount in the range of from about 0.2 to about 15 weight percent of the liquid carrier when the solid particulate is a water soluble polymer. Such water has been found to dissolve in the solid particulate polymer and thus serves to reduce the density of the particulate.

The ranges of the ingredients useful in the practice of this invention are as follows:

| Composition Components | Broad | Preferred |
| --- | --- | --- |
| Liquid carrier | 90–99.5 | — |
| Carrier soluble resin | 0.5–5 | 1.5–.3 |
| Clay | 1.0–5.0 | 2.0–4.0 |
| Activator | 0.5–5 | 2.0–3.0 |

All weights are in weight percent.
The ranges of the composition components are all physical mixtures.

To the resulting suspension medium there can be added the selected solid particulate in an amount in the range of about 10 to about 70 weight percent, preferably about 30 to about 60 weight percent, based on the weight of the total composition.

The addition of an antioxidant, a surfactant, a biocide to the basic suspension composition can be exercised, if desired, in the practice of this invention.

The product of this invention normally has a gel strength that is capable of suspending particulate matter. Additionally, this gel strength develops very rapidly or almost immediately. In addition, the suspensions have a desirable fragile property which is evidenced by the ease with which it pours.

The product of this invention is primarily tested by observation for stability over a wide temperature range. Stability can be measured by means of a rule or other such graduated device whereby there is determined the thickness from the interface of the clear liquid portion of that portion of liquid that separates from the portion of liquid containing suspended solids.

The following specific examples are intended to illustrate the advantages of the present invention and are not intended to unduly limit the scope of the invention.

EXAMPLE I

A series of suspension medium compositions were prepared by mixing the components in Table 1A. The 2-ethylhexyl oleate (Finagreen BDMF ester from Fina Chemicals) was weighed into the sample holder of an Osterizer Blender. Other suitable mixers could also be used. The other components were weighed separately and added during stirring.

For those fluids requiring organophyllic clay (Bentone SD3 from Rheox, Inc.), a high mixing speed was used in order to promote dispersion of the clay platelets. The ester and clay mixture was blended for three minutes, then the ethanol was added, and the mixture blended an additional 7 to 20 minutes. During this peirod, activation of the clay was evidenced by an apparent increase in the fluid viscosity.

The styrene-isoprene copolymer (Shellvis 40 from Shell Chemicals) was added to the fluid at a blending speed that was sufficient to provide effective stirring. High shear conditions were not apparently necessary. Mixing was continued until the polymer was completely dissolved, that is, until there were no longer any visible polymer particles. If used with organophyllic clay, the copolymer was not added until after the ester, clay, and ethanol mixture had shown an increase in viscosity.

TABLE 1A

| Run | Materials Used |
|---|---|
| 1 | 150 g Finagreen BDMF |
| 2 | 250 g Finagreen BDMF + 7.5 g Shellvis 40 |
| 3 | 200 g Finagreen BDMF + 20 g Water |
| 4 | 214 g Finagreen BDMF + 6.6 g Shellvis 40 + 22 g Water |
| 5 | 250 g Finagreen BDMF + 10 g Bentone SD3 + 5 g Ethanol |
| 6 | 250 g Finagreen BDMF + 10 g Bentone SD3 + 5 g Ethanol + 25 g Water |
| 7 | 250 g Finagreen BDMF + 10 g Bentone SD3 + 5 g Ethanol + 7.5 g Shellvis 40 |
| 8 | 250 g Finagreen BDMF + 10 g Bentone SD3 + 5 g Ethanol + 7.5 g Shellvis 40 + 25 g Water |

To each of the suspension media was added sufficient xanthan gum (Flowzan® from Drilling Specialties Co.) to produce a 40% w/w suspension of that xanthan gum, as detailed in Table 1B.

TABLE 1B

| Run | Materials Used |
|---|---|
| 1 | 150.0 g Suspension medium + 100.0 g Flowzan ® |
| 2 | 206.1 g Suspension medium + 137.4 g Flowzan ® |
| 3 | 219.2 g Suspension medium + 146.1 g Flowzan ® |
| 4 | 242.3 g Suspension medium + 161.5 g Flowzan ® |
| 5 | 189.4 g Suspension medium + 126.3 g Flowzan ® |
| 6 | 224.6 g Suspension medium + 149.8 g Flowzan ® |
| 7 | 206.7 g Suspension medium + 137.8 g Flowzan ® |
| 8 | 220.4 g Suspension medium + 146.9 g Flowzan ® |

The suspensions were each placed into pint jars or other clear glass containers. The height of the suspension ($H_{Total}$) was measured and recorded. The samples were stored under static, ambient conditions. Observations were made periodically. Except for run #8, each of these suspensions showed signs of particle settling at some time. This was evidenced by a separation of clear fluid at the surface. The thickness of that fluid layer ($H_{Fluid}$) was measured and compared to the original height of the suspension in order to determine the amount of settling, according to Equation 1.

$$\text{Settling} = 100\% * [H_{fluid}/H_{total}] \quad \text{(Equation 1)}$$

For example, the suspension in Run #2 had a total initial height of 8.7 cm. After 16 hours, a layer of clear fluid had formed at the surface which was 2.6 cm in thickness. Using Equation 1, that calculates to be 30% settling in this suspension.

The results of these tests are detailed in Table 1C.

TABLE 1C

| Run | Fluid Separation (particle settling) | | | | | | |
|---|---|---|---|---|---|---|---|
| 1 | 38% | 40% | 40% | 40% | 40% | 40% | 40% |
| 2 | 0% | 30% | 38% | 38% | 39% | 39% | 39% |
| 3 | 0% | 11% | 14% | 15% | 16% | 16% | 17% |
| 4 | 0% | 4% | 11% | 12% | 12% | 12% | 16% |
| 5 | 0% | 0% | 0% | 1% | 4% | 8% | 18% |
| 6 | 0% | 0% | 0% | 1% | 3% | 3% | 3% |
| 7 | 0% | 0% | 0% | 0% | 0% | 1% | 1% |
| 8 | 0% | 0% | 0% | 0% | 0% | 0% | 0% |
| Days = | 0.04 | 0.7 | 2 | 5 | 12 | 21 | 66 |

In 2-ethylhexyl oleate, the use of the styrene-isoprene copolymer (Run #2) was not effective in suspending the solids. Settling began within a day. Reducing the density of the suspended xanthan gum by adding water (Run #3 and #4) slowed the rate of particle settling, but that settling still began during the first day of the test. In this fluid, the organophyllic clay was seen (Run #5 and #6) to be much more effective as a suspending agent, with no indication of settling until the fifth day. Still, as a commercial product that is an insufficient time period.

Combining the styrene-isoprene copolymer and the organophyllic clay (Run #7) produced a suspension that was stable for 21 days. Even after 66 days, this suspension had only 1 mm of fluid at the surface. The addition of water (Run #8) further stabilizes the suspension, with no evidence of fluid separation within 66 days. This data clearly shows that a combination of the styrene-isoprene copolymer and the organophyllic clay (Run #7) is significantly more effective at suspending solids than either of these additives alone (Runs #2 and #5).

EXAMPLE II

A series of suspension medium compositions were prepared by mixing the components in Table 2A. In the first fluid, the 2-ethylhexyl oleate (Finagreen BDMF ester from Fina Chemicals) was weighed into a beaker. The methyl methacrylate (AC956 from Rhom & Haas) polymer was added and the mixture was stirred until the polymer was fully dissolved. The fluids containing the organophyllic clay (Bentone SD3 from Rheox, Inc.) required much greater shear in mixing. In these samples, the 2-ethylhexyl oleate was weighed into a pint jar and placed on an Osterizer blender. The organophyllic clay (Bentone SD3 from Rheox, Inc.) was added and the mixture was blended at high speed for 10 minutes. The ethanol was added and mixing was continued for an additional 30 minutes. In the third sample, the methyl methacrylate polymer was added and the fluid was mixed at low speed for a final 10 minutes.

TABLE 2A

| Run | Materials Used |
|---|---|
| 1 | 29.4 g Finagreen BDMF + 2.35 g AC956 |
| 2 | 189 g Finagreen BDMF + 8 g Bentone SD3 + 3.2 g Ethanol |
| 3 | 182 g Finagreen BDMF + 8 g Bentone SD3 + 6.4 g AC956 + 3.2 g Ethanol |

To each of these three fluids (suspension medium) was then added sufficient guar gum (EGMB from Economy Polymers, Inc., Houston, Tex.) to produce a 40% active particle suspension, as detailed in Table 2B.

TABLE 2B

| Run | Materials Used |
|---|---|
| 1 | 31.3 g Suspension Medium + 20.9 g Guar Gum |
| 2 | 200 g Suspension Medium + 133 g Guar Gum |
| 3 | 199 g Suspension Medium + 133 g Guar Gum |

The viscosity of the guar gum suspension was measured with a Bookfield DV-II viscometer using a #3 LV disk spindle. The particle settling time was determined in a manner similar to that detailed in Example I. These results are described in Table 2C.

TABLE 2C

| Run | Viscosity at 0.6 rpm Centipoise | Settling Time (days) |
| --- | --- | --- |
| 1 | 1600 | 0.01 |
| 2 | 29200 | 3 |
| 3 | 12400 | 29 |

The methyl methacrylate polymer produced very little viscosity in the fluid and was ineffective at suspending solids, evidenced by particle settling beginning within half an hour. The organophyllic clay produced considerably greater viscosity than the polymer, however it was still ineffective at suspending the guar gum, with settling beginning within three days. Surprisingly, the combination of polymer and organophyllic clays produced less fluid viscosity than the clay alone, yet the combination of additives produced a much more stable suspension. In this sample (Run #3), there was no indication of particle settling until 29 days. After 46 days, this sample still showed only 1% separation of clear fluid. This data shows that the stability of the particle suspension is not a direct result of the suspension viscosity, but rather is a result of the interaction between the organophyllic clay and dissolved resin.

The results shown in the above examples clearly demonstrate that the present invention is well adapted to carry out the objects and attain the end and advantages mentioned as well as those inherent therein. While modifications may be made by those skilled in the art, such modifications are encompassed within the spirit of the present invention as defined by the specification and the claims.

What is claimed is:

1. A suspending medium for solid particulate comprising a liquid carrier, a liquid carrier soluble resin, an activator and an organophyllic clay compound wherein said liquid carrier is a carboxylic acid ester, and wherein said liquid carrier, liquid carrier soluble resin, said activator, and said organophyllic compound are present in said suspending medium in an amount to effect the formation of a stable liquid suspension on the addition of a solid particulate thereto.

2. A suspending medium in accordance with claim 1 wherein said liquid carrier is present in an amount in the range of about 90 to about 99.5 weight percent, said liquid carrier soluble resin is present in an amount in the range of about 0.5 to about 5.0 weight percent, said organophyllic clay is present in an amount in the range of about 1.0 to about 5.0 weight percent, said activator is present in an amount in the range of about 0.5 to about 5.0 weight percent, and said solid particulate is present in an amount in the range of about 10 to about 70 weight percent based on the total weight of the suspension composition.

3. A suspending medium in accordance with claim 2 wherein said liquid carrier is a compound of the formula

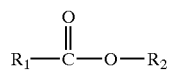

wherein $R_1$ is an alkyl group of 10 to 20 carbon atoms and $R_2$ is a lower alkyl group of from 1 to 10 carbon atoms.

4. A suspending medium in accordance with claim 3 wherein said carrier fluid is 2-ethylhexyl oleate.

5. A suspending medium in accordance with claim 1 wherein said liquid carrier soluble resin is selected from the group consisting of styrene-isoprene copolymers, styrene ethylene-propylene block copolymers, styrene isobutylene copolymers, styrene butadiene copolymers, polybutylene, polystyrene, polyethylene-propylene copolymers, methyl methacrylate, and mixtures thereof.

6. A suspending medium in accordance with claim 5 wherein said liquid carrier resin is a hydrogenated styrene-isoprene block copolymer.

7. A suspending medium in accordance with claim 5 wherein said liquid carrier resin is methyl methacrylate.

8. A suspending medium in accordance with claim 1 wherein said organophyllic clay compound is selected from the group consisting of kaolinite, halloysite, vermiculite, chlorite, attapulgite, smectite, montmorillonite, bentonite, hectorite, and mixtures thereof.

9. A suspending medium in accordance with claim 8 wherein said organophyllic clay is sodium montmorillonite (hectorite).

10. A suspending medium in accordance with claim 1 wherein said solid particulate is selected from the group consisting of water-soluble polymers, herbicides, insecticides, sulfonated asphalt, salts of sulfonated asphalt, lime, sodium bicarbonate, sodium carbonate, molybdenum disulfide, sodium hydroxide, graphite, zinc, tin, quebracho, lignin, lignite, caustisized lignite, lignosulfonates, chrome lignosulfonates, naphthalene sulfonate, unintahite, and combinations of two or more thereof.

11. A suspending medium in accordance with claim 10 wherein said solid particulate is guar gum.

12. A suspending medium in accordance with claim 1 wherein said activator is an alcohol of the formula R—OH wherein R is an alkyl group of from 1 to 8 carbon atoms.

13. A suspending medium in accordance with claim 12 wherein said alcohol is present in an amount in the range of about 0.5 to about 5.0 weight percent.

14. A suspending medium in accordance with claim 1 wherein said liquid carrier is a mixture of a carboxylic acid ester and a vegetable oil.

15. A suspending medium in accordance with claim 14 wherein said vegetable oil is present in an amount in the range of about 10 to about 50 weight percent of the total liquid carrier.

16. A suspending medium in accordance with claim 15 wherein said liquid carrier is 2-ethylhexyl oleate and said vegetable oil is soybean oil.

17. A suspending medium in accordance with claim 1 wherein said liquid carrier is 2-ethylhexyl oleate, said liquid carrier soluble resin is a hydrogenated styrene-isoprene block copolymer, and said organophyllic clay is sodium montmorillonite.

18. A suspending medium in accordance with claim 1 wherein said liquid carrier is 2-ethylhexyl oleate, said liquid carrier soluble resin is methyl methacrylate and said organophyllic clay is sodium montmorillonite.

19. A suspending medium in accordance with claim 1 wherein there is additionally present water in an amount in the range of about 0.2 to about 15 weight percent of the liquid carrier.

* * * * *